United States Patent [19]
Hyatt

[11] 3,820,894
[45] June 28, 1974

[54] APPARATUS AND METHOD FOR PRODUCING HIGH REGISTRATION PHOTO-MASKS

[76] Inventor: Gilbert P. Hyatt, 11101 Amigo Ave., Northridge, Calif. 91324

[22] Filed: Apr. 13, 1972

[21] Appl. No.: 229,213

Related U.S. Application Data

[63] Continuation-in-part of Ser. No. 101,881, Dec. 28, 1970, Continuation-in-part of Ser. No. 134,958, April 19, 1971, Continuation-in-part of Ser. No. 135,040, April 19, 1971.

[52] U.S. Cl. .................................. 355/86, 355/95
[51] Int. Cl. ........................................ G03b 27/04
[58] Field of Search .................. 355/53, 54, 86, 95

[56] References Cited
UNITED STATES PATENTS

| 3,048,093 | 8/1962 | Loro | 355/86 X |
| 3,354,806 | 11/1967 | DeLang et al. | 355/86 |
| 3,498,711 | 3/1970 | Ables et al. | 355/86 X |

Primary Examiner—Richard M. Sheer
Assistant Examiner—Richard A. Wintercorn

[57] ABSTRACT

A system is provided for producing high registration photo-optical masks. A control system generates signals to a step and repeat contact printing machine that exposes many prints of the master die images on a photographic film, where these prints have a high registration characteristic.

45 Claims, 10 Drawing Figures

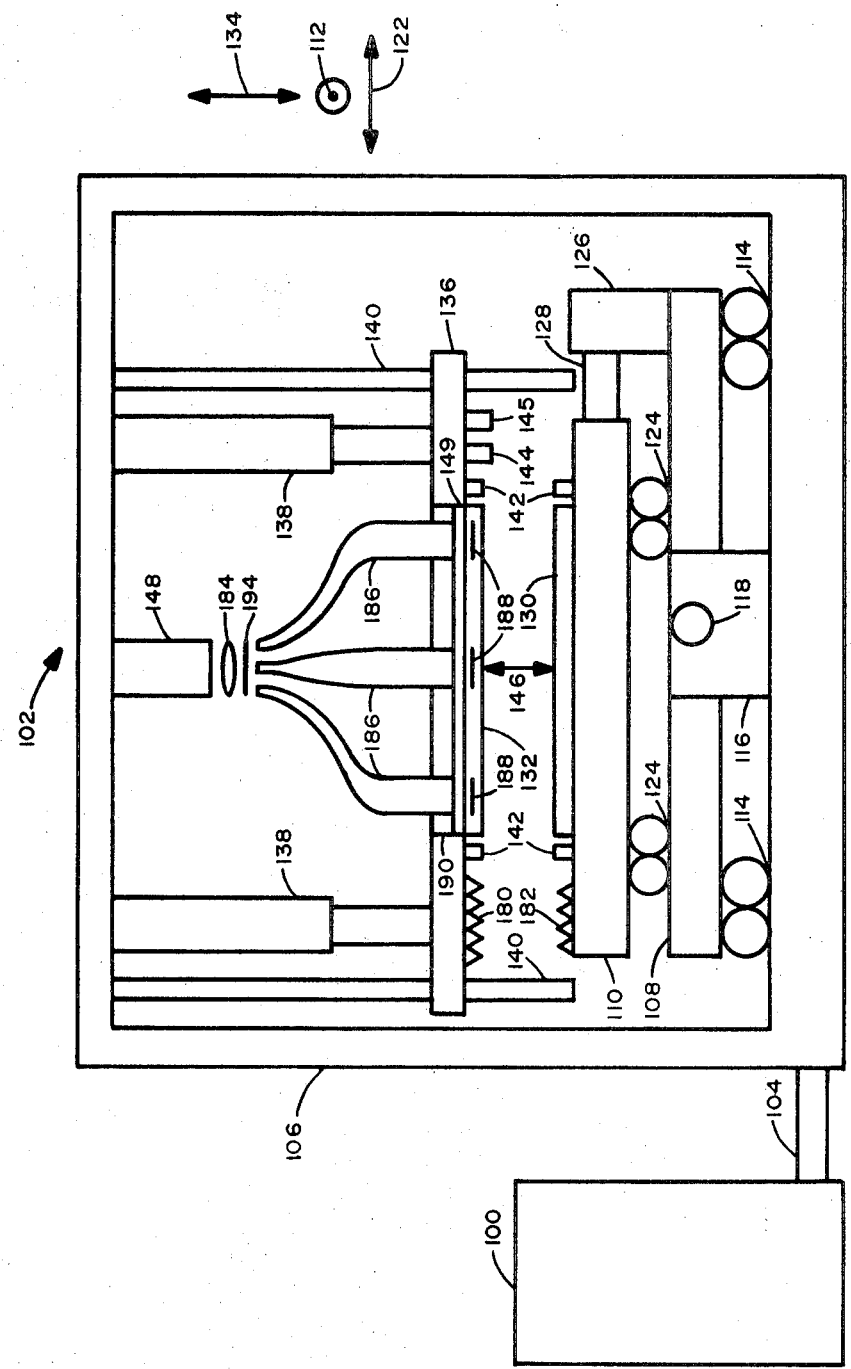
FIG—1

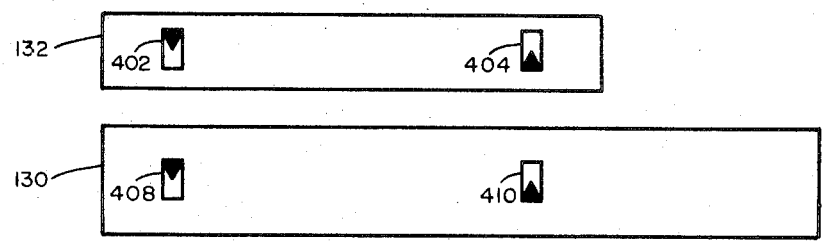
FIG-2A
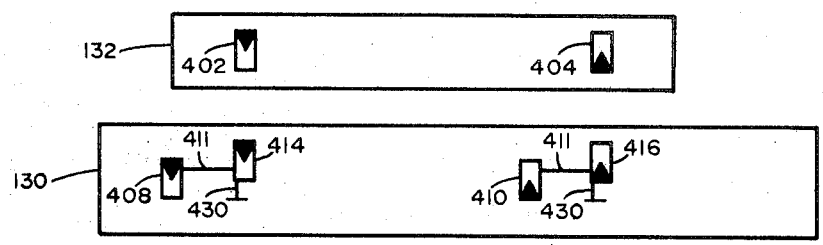
FIG-2B
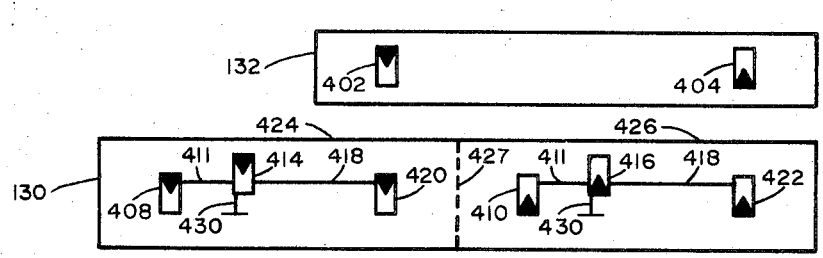
FIG-2C
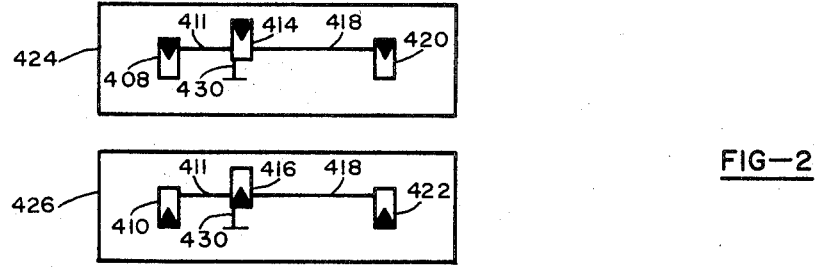
FIG-2D
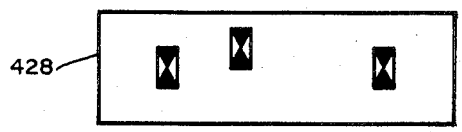
FIG-2E
FIG-2

APPARATUS AND METHOD FOR PRODUCING HIGH REGISTRATION PHOTO-MASKS

CROSS REFERENCE TO RELATED APPLICATIONS

This application is a continuation-in-part of copending applications
1. FACTORED DATA PROCESSING SYSTEM FOR DEDICATED APPLICATIONS Ser. No. 101,881 filed Dec. 28, 1970, by Gilbert P. Hyatt;
2. CONTROL SYSTEM AND METHOD Ser. No. 134,958 filed Apr. 19, 1971 by Gilbert P. Hyatt; and
3. CONTROL APPARATUS Ser. No. 135,040 filed Apr. 19, 1971 by Gilbert P. Hyatt and is further related to copending application ADAPTIVE ILLUMINATION SOURCE INTENSITY CONTROL DEVICE Ser. No. 152,105 U.S. Pat. No. 3,738,242 filed on June 11, 1971 issued on June 12, 1973 by Barry T. Lee, Gunther W. Wimmer, and Gilbert P. Hyatt; said copending application CONTROL APPARATUS and said patent ADAPTIVE ILLUMINATION SOURCE INTENSITY CONTROL DEVICE providing non-essential material and being incorporated herein by reference as if fully set forth at length herein.

BACKGROUND OF THE INVENTION

1. Field of the Invention

The field of the invention is a system for the generation of photographic masks for photo-chemical processes.

2. Prior Art

It is recognized in the prior art that good registration is required for various photo-chemical processes such as in the manufacture of integrated circuits. The prior art does not distinguish between positional accuracy and registration, where good registration is achieved indirectly in prior art equipment by providing good positional accuracy. When registration in the magnitude of ten millionths inches is required, systems with positional accuracy in the magnitude of ten millionths inches are provided to achieve this range of registration. These systems are typified by the Photorepeater System, Series 1795, manufactured by the David W. Mann Company; the Automated Microflash Camera, Model 610, manufactured by Opto-Mechanisms Inc.; and the Step and Repeat machine, Model 4M-1-0AXYL, manufactured by the Jade Corporation. These prior art systems provide ultra-high accuracy positioning with a projection exposure technique. They are very expensive, very complex, and are limited in the registration precision that can be provided.

SUMMARY OF THE INVENTION

Precision photographic masks are required for various photographic processes such as photo-chemical processes which are used in the manufacture of integrated circuits, printed circuits, thin film hybrid circuits, thick film hybrid circuits, chemical milling, and other such applications. In these processes, mask registration is of primary importance; where mask positioning accuracy is only a secondary consideration. This invention provides a simple, inexpensive apparatus and method to produce high registration masks. This invention will be described for a photo-chemical process used in the manufacture of integrated circuits. It should be understood that any reference to an integrated circuit mask making system is intended to include any system wherein high registration capability is to be provided. The particular system discussed herein is one class of such devices.

The integrated circuit manufacturing process is a photo-chemical process, wherein a large array of integrated circuit dice are batch fabricated on a single semiconductor wafer. The integrated circuits are built up with layers of selective diffusions, depositions, and etching process steps. The areas to be affected are selected with a photoresist process, exposed through photographic masks. This process is described in detail in the book Integrated Circuits, Edited by Raymond M. Warner Jr. and James N. Fordemwalt, published by the McGraw-Hill Book Company incorporated herein by reference.

The multitude of dice on a wafer are eventually separated from one another with a scribing operation. Because each die is independent of all other dice when separated, the positional accuracy of one die on a wafer relative to another die on that wafer is only of secondary importance.

The multitude of process steps required to complete an integrated circuit wafer may exceed twenty steps. Many of these process steps are photo-chemical steps, requiring the selective exposure of photoresist through an optical mask, then the removal of the masked portion of photoresist to permit selective diffusions or other process operations. It is necessary that these selective operations precisely overlay other preceeding or following operations to provide controlled die characteristics. The measure of this overlay characteristic is known as registration.

In the manufacture of integrated circuits, registration is critical. Each successive mask must register with all other masks. Corresponding areas of each die must register when the masks are aligned, one on top of the other.

In this invention, it has been recognized that good position accuracy is not necessary for good registration, where this invention provides a system with relatively poor positional accuracy but relatively good registration. The sacrifice of unnecessary position accuracy permits a very low cost system to be provided that can generate the highest levels of registration.

This invention eliminates the need for expensive, complex prior art devices used to achieve high accuracy prints in prior art systems such as air bearing supports, interferometer sensors, and complex optics; yet provides a low cost, simple system with high registration. In addition, error mechanisms associated with the prior art projection systems such as focusing and distortions are eliminated with the contact print system of this invention.

Registration between the printed masks generated with this invention is primarily a function of the dimensional stability of the master and the film. The master and film typically have glass substrates which provides good dimensional stability. The photo-process operations are typically performed in a clean room that has a precise environmental control system to insure stability of the master and film. Also, the contact print process for emulsion to emulsion prints provides masks without measurable loss in precision. This assures levels of registration that is not possible with prior art projection type systems.

A system is described which includes a control subsystem and a machine subsystem for generating high registration photographs. In this embodiment, the film is translated in an X direction and a Y direction directly under the master. A Z axis contact print device containing a master is held above the film mounted on the translating table. At appropriate times, this Z axis device is actuated to bring the master into contact with the film. The illumination source is then permitted to selectively expose the film through the master for a contact print. The Z axis device then retracts to provide clearance to translate the film to a new print position.

An object of this invention is to provide a system for producing high registration masks.

A further object of this invention is to provide a practical contact printing system.

A further object of this invention is to provide a high registration mask making system that eliminates the expense and inaccuracies of photographic projection devices.

A fruther object of this invention is to provide a high registration mask making system that eliminates the expense of a high accuracy positioning system.

Another objective of this invention is to provide a contact print machine capable of providing precise contact prints.

Still another objective of this invention is to provide a method for generating high registration contact prints.

The foregoing and other objects, features, and advantages of this invention will be apparent from the following detailed description of preferred embodiments of this invention, as illustrated in the accompanying drawings.

BRIEF DESCRIPTION OF THE DRAWINGS

A better understanding of the invention may be had from a consideration of the following detailed description, taken in conjunction with the following drawings, in which:

FIG. 1 is a schematic and block diagram representation of the contact print system.

FIG. 2 comprising FIGS. 2A–2E provides a schematic diagram of sequential printing operations.

DETAILED DESCRIPTION OF THE INVENTION

Figure 3:
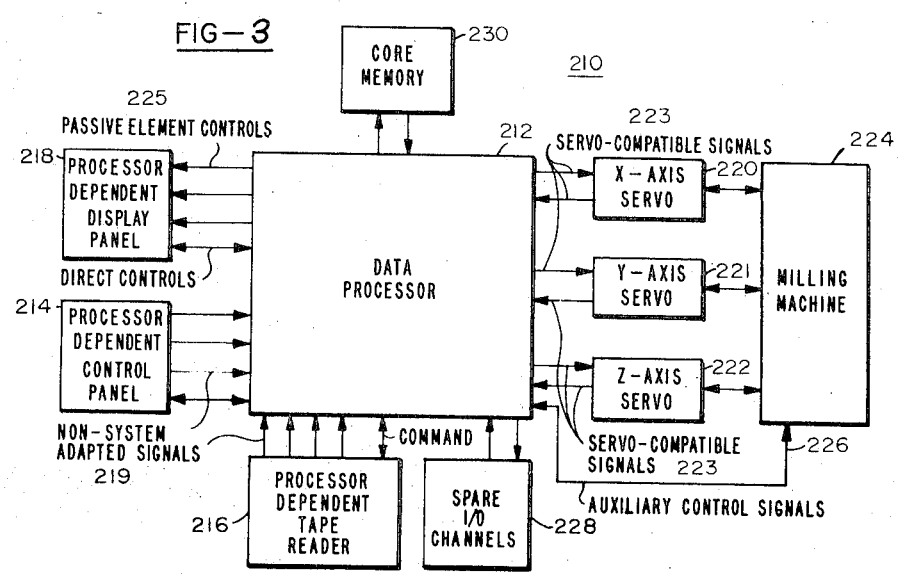
FIG. 3 is a block diagram of a numerical control system in accordance with the invention.

The contact print system can take any one of a number of possible forms. A preferred embodiment of the present invention is shown in FIG. 1 and will be described in detail hereafter. The principles of the high registration contact print operations will be demonstrated in an example following the description of the preferred embodiment.

By way of introduction of the illustrated embodiment, the components shown in FIGS. 1 through 6 of the drawings have been assigned the general reference numerals and a brief description of each such component is given in the following description.

CONTACT PRINTING SYSTEM

With reference to FIG. 1, the control subsystem 100 controls the machine 102 in the contact print operations. The preferred embodiment of this control subsystem 100 is described in referenced copending application Factored Data Processing System For Dedicated Applications. This control subsystem 100 is connected to the machine subsystem 102, with interconnection cabling 104. The machine comprises a main structural base 106, an X translational device 108, a Y translational device 110, and a Z translational device 136. The X translational device 108 translates in the X direction 112 (perpendicular to the plane of the drawing) on X bearing surfaces 114 driven by the X drive 116 through the X lead screw 118. The Y translational device 110 translates in the Y direction 122 on Y bearing surfaces 124 driven by the Y drive 126 through Y lead screw 128. The Z printing device 136 is mounted on the overhead structure 106 to provide Z axis motion 134 for contact printing of the master 132 on the film 130. The control subsystem 100 generates X drive signals to control the X drive 116 and Y drive signals to control the Y drive 126 to position the X translational device 108 and the Y translational device 110 to the commanded positions. The control subsystem 100 also generates Z actuation signals and lamp exposure signals to perform the contact printing operations.

The Y translational device 110 provides for mounting of the film 130 and for translation of the film 130 in the Y direction 122. The term film herein refers to the illumination sensitive medium exposed to illumination through the master image. In the preferred embodiment, the film is a photosensitized glass plate which is selectively exposed to light through the master. The X translational device 108 is used to translate the Y translation device 110 in the X direction 112 relative to the base 106. An upper base structure 106 mounts the Z printing device 136 which is used for bringing the master 132 into contact with the film 130. The Z printing device 136 is driven with Z actuator 138 and moves in the Z direction 134 on guides 140. Precision alignment surfaces 142 can be used to control the contact pressure between the film 130 and the master 132. A proximity sensor 144 such as a switch detects when the mask is near contact with the film. A contact sensor 145 such as a switch detects when the mask is in contact with the film. Other proximity and contact sensors and arrangements will become obvious to those knowledgeable in the art. The contact sensor 145 can provide an interlock to inhibit motion in the X direction 112 and the Y direction 122 during the contact print operation. The proximity sensor 144 can be used to control system operation when the film 130 and the master inhibit 132 are not in contact but close to contact.

In this preferred embodiment, the main structure 106 carries the weight of the Z translation device 136, the guides 140, the Z actuator 138, the illumination source 148, and various other devices associated with the Z printing device 136. The X translational device 108 and Y translational device 110 are shown carrying the film, where the devices that must be translated are minimized with this embodiment. The major weight is carried by the main structure 106 and not by the X and Y translational devices. The Z motion 134 of the Z printing device 136 has associated Z acceleration reaction forces, which are also supported by the main structure 106.

Many alternate embodiments will become obvious to those knowledgeable in the art. One alternate embodiment mounts the Z printing device 136 on the Y translational device 110. Still another embodiment mounts the Y bearing surfaces 124 on the structural base 106, where the base 106 directly carries the weight of the Y translational device 110. In that embodiment, the film 130 may be mounted on the X translational device 108 and the master 132 with the associated contact printing devices may be mounted on the Y translational device 110 for relative two dimensional motion therebetween.

Alignment surfaces 142 and sensors 144 and 145 may be adjustable to provide for film and master thickness. This adjustment can also provide for control of the contact pressure between the film 130 and the master 132. Alignment of the film 130 and the master 132 in the X-Y plane during contact can be accomplished by the relative adjustment of the alignment surfaces 142.

Compliance in the Z direction 134 will insure good contact between the film 130 and the master 132. This compliance can be provided in the film mounting Y translational member 110, the master mounting base 149, the alignment surfaces 142, or other devices for providing compliance. Where the film 130 and master 132 contact surfaces are flat to precision requirements such as with ground glass plates, a rigid contact without significant compliance can be provided; but adjustment of the alignment surfaces will be more critical to provide proper contact pressure.

The mounting of the film 130 to the Y translational device 110 and the master 132 to the Z translational device 136 can be performed with spring clips, vacuum devices or other devices that will be obvious to those knowledgeable in the art.

It should be made clear that the relative angular orientation of the master and film must be repeatable for each contact print. As will be disclosed in detail hereafter, position errors will not adversely affect the registration because all of the printed images that must overlay are printed simultaneously and therefore contain the same positional relationships. Similarly, rotational errors will not adversely affect the registration because all printed images that must overlay are printed simultaneously and therefore contain the same rotational relationships. Unfortunately, rotational errors will also produce translational errors, where the displacement of a printed image due to the relative rotation of the master and the film is proportional to the distance from the center of rotation. Because of the distribution of images over the area of the master and the film, the tangential displacements due to rotation will displace images by different amounts which will result in poor registration. Therefore, the relative rotation of the film and master must be kept as small as possible and special apparatus may be provided to achieve good orientation repeatability in the presence of poor positional precision.

A device will now be described to reduce relative rotation of the film and master. The Z printing device 136 translates in the Z direction 134 under control of the Z actuator 138. Precision taper guides 140 are provided to direct the Z printing device 136 as it translates toward the Y translational device 110, where the taper will increase to control the orientation of the Z printing device 136 as it approaches the Y translational device. In addition, the X translational device 108 and the Y translational device 110 must have tightly fitting and straight bearings and slides to minimize rotation about the Z axis 134.

Another device for reducing relative rotation between the film 130 and the master 132 will now be described with reference to FIG. 1. The Z translational device 136 contains a Z groove device 180 which is oriented closely with a Y groove device 182 contained on the Y translational device 110. When contact is made between the film 130 and the master 132, the Z groove device 180 interlocks with the Y groove device 182 to provide for rotational orientation between the film 130 and the master 132. Other devices for reducing rotation between the film 130 and the master 132 will become obvious to those knowledgeable in the art.

An illumination source 148 is provided for exposing the film 130 through the master 132. The illumination is conducted from the illumination source 148 to a diffuser 149 which distributes the illumination across the master 132 to provide suitable illumination. Various illumination conductor and diffuser devices can be used such as lucite panels, frosted glass, or other devices which will become obvious to those knowledgeable in the art.

Precision collimated illumination can be used most efficiently when it is directed only to the master die image areas that need to be illuminated, which may comprise only a fraction of one percent of the illumination required to illuminate the total master area. One embodiment is shown in FIG. 1 wherein the illumination source 148 generates illumination which is processed by lens system 184 to provide processed illumination to fiber optic bundles 186. These bundles 186 are each positioned to illuminate a master die image 188 on the master 132. A positioning device 190 is used to position the bundles 186 and can provide an adjustable means for positioning the bundles 186 over the die images 188. A mount such as diffuser 149 can be provided for mounting and illuminating the master 132. An alternate embodiment would provide a separate illumination source 148 and illumination processing device 184 for each master die image 188. An adjustable positioning device 190 is desirable to permit masks of various configurations to be generated. Other embodiments of this selective illumination means will become obvious to those knowledgeable in the art.

Excitation of the illumination source can be initiated after contact has been made between the film 130 and the master 132. If the illumination source 148 has a long time constant such as with an incandescent lamp, an anticipatory illumination control can be provided to excite the illumination source 148 prior to contact for reducing the time delay to achieve the required illumination after contact. The light source control signal can be generated from the control subsystem 100, the proximity sensor 144, the contact sensor 145, or other means. A combined illumination source control can be implemented where the control subsystem 100 can enable the illumination source excitation and the contact sensor 145 can excite the illumination source 148 when a contact print is performed, but only if enabled. An alternate embodiment would provide a shutter 194 associated with the illumination source 148 to precisely control the exposure time. The shutter 194 could be controlled by a signal such as from the control subsystem 100 or from the contact sensor 145.

The illumination source 148 may be (1) an incandescent lamp such as tungsten, quartz iodite, or tungsten halogen; (2) a solid state lamp such as a light emitting diode or an electro-luminescent panel; (3) a gas lamp such as an Xenon flash tube; (4) or other illumination source.

It is to be noted that registration is a primary consideration, where static accuracy is only a secondary consideration and dynamic accuracy is only a tertiary consideration. Therefore, effects such as inaccuracies in following a path and overshot of the final position are of little concern. Maximum translational velocity from one position to the next position can be provided without undue emphasis on machine dynamics. Rapid acceleration and deceleration can be provided because the final registration is relatively independent of machine dynamics such as resonance and overshoot. Even if resonance, overshoot, or other such dynamic effects are not damped out before the contact print operation is performed, these dynamic effects contribute only to position errors, but not to registration errors.

Rapid actuation of the Z actuator 138 increases throughput without significantly degrading positioning accuracy or registration. Repositioning can be initiated prior to full retraction of the Z printing device 136, where X-Y motion can be enabled immediately after the film 130 and master 132 surfaces are apart, as sensed by a proximity sensor 144 or a contact sensor 145. In addition, actuation of the contact print operation with the Z printing device 136 can be enabled immediately prior to obtaining the final position of the X translation device 108 and the Y translation device 110, where the time constant associated with the Z actuator 138 and the time to translate to a contact condition will permit the X translational device 108 and the Y translational device 110 to reach their commanded positions. Anticipatory time delays can be used to maximize the speed of operation by performing compatible operations simultaneously instead of sequentially. For example, the Z axis contact print translation can be initiated shortly before the X-Y final position is reached because of the time to translate the Z translation device from a retracted to a contact position will permit the X-Y final position to be reached. Similarly, the X-Y axis translation can be initiated shortly after the Z translational device has started to retract but before the fully retracted Z position has been achieved. These anticipatory commands can be provided from the control subsystem 100.

An alternate control embodiment for the contact print operation will provide rapid Z motion when the film 130 and master 132 are far apart, but slow Z motion when the film 130 and master 132 are close together. This Z motion control can be provided by a proximity sensor 144, where Z motion is rapid when the proximity sensor 144 is not activated but Z motion is slow when the sensor 144 is activated. For this embodiment, the Z translational device 136 will translate rapidly until the sensor 144 is activated, then translate slowly until contact is made. For retraction, the Z translation device 136 will translate slowly until the sensor 144 is deactivated, then translate rapidly to the retracted position.

The Z distance 146 between the film 130 and the master 132 must provide sufficient clearance for loading new film 130 and new masters 132 during the setup operation. This Z distance 146 should be minimized for contact print operations to minimize the actuation and retraction time for the Z printing device 136. The clearance for loading may be a thousand times greater than the clearance for printing operations. For loading, a Z clearance 146 of several inches may be required. For printing, a small Z clearance 146, possibly less than a thousandth inch, may be sufficient. Therefore, use of a first large clearance for loading operations and a second small clearance for printing operations may both be used with the system of this invention. As an alternate embodiment, the Z translation device may be removable for loading to provide access to the film 130 and master 132.

The control subsystem 100 accepts digital data inputs such as through a tape reader, switches, or other known devices. These inputs define the exposure conditions, machine operations, and exposure positions. The control subsystem 100 processes this input data and controls the machine 102 to perform the required operations. One embodiment of this control system is described in the related copending applications. Other embodiments will become obvious to those knowledgeable in the art.

The details of the high registration contact printing process will next be described by way of example with reference to FIG. 2, which represents successive operations in the contact printing process of this invention. The master 132 is shown with only two die images 402 and 404 for clarity. In the integrated circuit process, ten die images for ten different process masks is not unusual. It should be noted that a cluster of prints of each die image 424 and 426 are separated into individual clusters, where each cluster of prints of the same master die image forms a mask for one step of the photo-chemical process. Similarly, for clarity, only three contact printing operations are shown in FIGS. 2A, 2B, and 2C. In the integrated circuit process, four hundred printing operations may be used, generating four hundred integrated circuit dice on the wafer, or in the transistor process, one thousand printing operations may be used, generating one thousand transistor dice; where each printing operation forms one die print on each mask that corresponds to a particular die on an integrated circuit wafter. Similarly, for clarity, only a single X dimensional array of die images are discussed. In the integrated circuit process, this X dimensional row is duplicated many times in the Y dimension for a two dimensional row and column array of die prints.

Three successive die printing operations are shown in FIGS. 2A, 2B, and 2C. The division of the two printed masks is shown in FIG. 2D and the overlay of the two masks is shown in FIG. 2E. The triangular shapes of the two master die images were selected to make obvious the registration of the two clusters 428 in FIG. 2E.

Now referring to FIG. 2A, the master 132 with the first master die image 402 and the second master die image 404 is used to make a first contact print on the film 130; where the first die image 402 makes the first print of the first die image 408 and the second die image 404 makes the first print of the second die image 410. The relative positions of the first die prints 408 and 410 are identical to the relative positions of the master die images 402 and 404.

In FIG. 2B, the machine 102 has moved the film 130 a first step distance 411 from the first contact print position. Now the master 132 with the first die image 402 and the second die image 404 is used to make a second contact print on the film 130, where the first die image 402 makes the second print of the first die image 414 and the second die image 404 makes the second print of the second die image 416. The relative positions of the second die prints 414 and 416 are identical to the relative positions of the master die images 402 and 404. The relative distances between the first print of the first die image 408 and the second print of the first die image 414 is the distance 411, which may contain positional errors in the X direction and the Y direction but is identical to the relative positions between the first print of the second die image 410 and the second print of the second die image 416, which is also distance 411.

This distance 411 is shown in exaggerated form to demonstrate the concept of good registration in conjunction with poor positional accuracy. The amount of displacement and the direction of displacement is only of secondary concern because the relation between the first and second die prints for each die image is the same, X distance 411 and Y distance 430. These positional relationships between corresponding prints of a die image are the same for each cluster of die prints. Therefore, the registration between these clusters will not be affected by the positional relationships within each cluster.

In FIG. 2C, the machine has moved the film 130 a second step distance 418 from the second contact print position. Now the master 132 with the first die image 402 and the second die image 404 is used to make a third contact print on the film 130, where the first die image 402 makes the third print of the first die image 420 and the second die image 404 makes the third print of the second die image 422. The relative positions of the third prints 420 and 422 are identical to the relative positions of the master die images 402 and 404. The relative distances between the second print of the first die image 414 and the third print of the first die image 420 is distance 418, which may contain position errors in the X direction and the Y direction but is identical to the relative positions between the second print of the second die image 416 and the third print of the second die image 422, which is also distance 418. This distance 418 is shown in exaggerated form to demonstrate the concept of good registration in conjunction with poor positional accuracy.

Only the X displacements of the die images have been considered. Now the Y displacements of the die images will be discussed. In FIG. 2C, the Y position of the first and third die prints of the first die image 408 and 420 are shown with the same Y displacement. The Y position of the second die print of the first die image 414 is shown displaced in the Y direction by the Y distance 430. This Y distance 430 is a positional error shown in exaggerated form to demonstrate the concept of good registration in conjunction with poor positional accuracy. This positional error has been introduced because the film 130 has been displaced in the Y direction relative to the master 132. Therefore, the second print of the second die image 416 was also displaced by the Y distance 430 relative to the Y position of the first and third die prints of the second die image 410 and 422. Because this Y positional error 430 is common to both clusters 424 and 426, the registration between these two clusters will be unaffected by this Y positional error as will be shown in the following description of FIG. 2D and FIG. 2E.

As shown in FIG. 2C, the first cluster of prints of the first die image 424 and the second cluster of prints of the second die image 426 are divided at position 427 to provide independent clusters shown in FIG. 2D. The distances between the various prints of the first die image in the first cluster 424 are not equal, where the first distance 411 is not equal to the second distance 418. The various prints of the second die image 410, 416, and 422 in the second cluster 426 have the same positional inaccuracies as the various prints of the first die image 408, 414, and 420 in the first cluster 424. Therefore, when the first cluster 424 and the second cluster 426 are placed over one another and one die print of the first cluster 424 (for example die print 408) is placed over the corresponding die print of the second cluster 426 (for that example, it is die print 410); then all first die prints precisely overlay with all second die prints as shown in FIG. 2E, where the combination of overlayed clusters 428 have good registration. The precision of this registration is relatively independent of the positional errors associated with each print operation and is primarily a function of the stability of the die image representations 402 and 404 on the master 132.

If a large number of print steps are performed in a two dimensional X-Y array, then a large array of die prints of each die image will be provided for each cluster; where each cluster will represent a wafer mask for one step in the photo-chemical process for producing a semiconductor wafer. Four hundred die images are typical for a single integrated circuit wafer.

If a large number of master die images are provided in a two dimensional X-Y array on the master (16 for example), then a large number of clusters or masks will be generated (16 for this example) for the various photo-chemical process steps, where each mask may be used in a different operation in the manufacture of a semiconductor wafer.

It should now be obvious to one skilled in the art that the registration between a large number of masks can be very good although the positioning accuracy of large numbers of die prints on each mask is very poor.

The contact print operations are usually performed in a dark room, but the machine may be provided with a cover to permit operations in a lighted room with a covered machine. After the film is exposed, it must be processed as with well known photographic development processes. After processing, the film will be divided into individual masks such as masks 424 and 426 usually be mounted in mask frames for alignment, handling, and mounting.

The operation of the contact print operations will be better understood by considering a description of the master. In the preferred embodiment, the master is made by placing a plurality of die images 402 and 404 on a master 132 where each master die image will generate a mask. The distance between each die image would correspond to the distance between centers of the masks to be generated. For example, the master die images might be three inches apart for a two inch diameter wafer with one inch clearance between wafer masks. A two dimensional array of master die images will provide a two dimensional array of masks after the contact printing operations. The X and Y positions of these die images on the master need not be precisely controlled because these dimensions only define the center to center distances for the array of wafer masks, which will be separated after the printing process. The angular orientation of these die images is critical as in prior art systems because the rotational orientation will affect rotational registration between masks. Therefore, each die image should be rotationally oriented precisely corresponding with all other die images. The master will contain the die images as negatives to insure that the large areas between die images are opaque to preclude exposing the film except where a die image is to be printed.

Although this invention has been described with respect to making high registration masks, it will be recognized that other high registration operations can be provided without first generating a mask.

The preferred embodiment of this invention is characterized by relatively large mounting devices for the film 130 and master 132 with relatively small displacements of the X translational device 108 and the Y translational device 110. The film and master dimensions may be twelve inches square to provide 16 masks in a four by four array with three inch spacing between centers. The X and Y displacements may be only two inches based upon the diameter of a typical wafer mask or may be up to four inches for large masks.

Figures are presented in schematic form, wherein the symbols and form used may only be representative of the physical embodiment of electrical or mechanical devices. In addition, these schematics are simplified for ease of presentation of primary features, where features not essential to the description may be eliminated. The simplified symbolic representations in the figures are intended to represent actual devices and are intended to include those other features that would be obvious to those knowledgeable in the art for the implementation of an embodiment of this invention.

It should be appreciated that the term "registration" as used in the specification and the claims refers to the measure of the overlay of corresponding portions of a group of arrays. It is obvious to those knowledgeable in the art that reference marks are often provided and aligned for corresponding areas to overlay, where the term registration is intended to include all necessary reference marks, alignment, and other such well known techniques, means, and methods.

Contact exposures are often referred to as contact prints, wherein the terms "exposure" and "print" may be used interchangeably. Also, the various photographic processes such as developing, washing and fixing the film are well known in the art and may be assumed as part of the photographic process. Therefore, no formal distinction is made between an exposed film and an exposed film that has been developed, washed, fixed, and otherwise processed to provide a useable mask. Terms such as exposure, print, and mask may be used interchangeably and are intended to include all necessary photographic processing well known in the art to provide the required characteristics.

SYSTEM DESCRIPTION

In a typical example of the operation of the system of FIG. 3 for control of a milling machine 224, the data processor 212 accepts part program data from the tape reader 216 and operator inputs from the control panel 214 to commence the computation of servo commands. As the reader 216 and panel 214 are operated, the processor 212 is under program control to monitor the operative states and pre-process data. Concurrently, and also under program control, the display panel 218 is activated by exciting the passive elements to form desired characters at a flicker-free rate. These monitoring and pre-processing subtask functions concerned with the extremities 214, 216, 218, 220, 222 continue to be carried out as the processor 212 performs computational and processing functions concerned with its main task, that of executing the part program. Thereafter, command data is translated into servo commands for the individual servos 220, 221, and 222 in servo signal form. Feedback signals in the servo format are likewise returned to the processor 212, pre-processed for conversion into the processor base language and utilized in further computations.

As shown in FIG. 3, the data processor 212 receives data from the various input sources, performs calculations or otherwise manipulates data in accordance with the input information and outputs processed information to control the machine 224 through servos 220, 221, and 222 and auxiliary control signals 226.

The present invention more particularly incorporates computer functions of controlling, performing mathematical operations, and storing data into a physically distributed, operatively dispersed system providing control of coaction with extremities.

In a preferred embodiment, this digital computer is a stored program digital computer described in detail in the parent patent application. The stored program computer is controlled by a program comprising computer instructions stored in a memory and accessed by instruction execution digital logic to perform computations and to generate outputs and receive inputs with output and input instructions.

Programming of digital computers is well known in the art and is not intended to be part of this invention. Those skilled in the programming art will be able to provide programs of computer instructions for generating output commands with the output instructions described herein and to receive feedback signals with the input instructions described herein. Well known programming techniques are described in textbooks such as PROGRAMMING: AN INTRODUCTION TO COMPUTER LANGUAGES AND TECHNIQUES by Ward Douglas Maurer for Holden Day Inc. (1968); PROGRAMMING FOR DIGITAL COMPUTERS by Joachim Jeenel for McGraw-Hill (1959); and ELEMENTS OF COMPUTER PROGRAMMING by Swallow and Price for Holt, Rinehart, and Winston (1965); incorporated herein by reference.

The milling machine 224 is an extremity of the system which can be implemented as an elemental extremity in conjunction with the data processor 212. Direct control of the various machine functions, such as storing the tool positions, compensating for tool characteristics, and controlling a turret motor for tool selection, reduce the machine interface that is often implemented with relay logic and other such "magnetics". The machine axes pickoffs in the square-wave servo loop can be used directly by the data processor to derive position, velocity and acceleration information pertaining to the motion of machine axes.

The axes servos 220-222 are a typical example of extremities. The communication between the data processor and the axes servos is in a signal form wherein the whole number aspect is intrinsic to the data processor and wherein the square-wave aspect is intrinsic to the axes servos. This intrinsic signal form simplifies the communication interface between the data processor and the axes servos and relieves limitations previously imposed on servos for numerically controlled machines.

The operative dispersion associated with this factored computer system is typified by the multi-axes contouring capability of the system. The data processor performs the contouring computations in whole number form intrinsic to the data processor and generates the resultant whole number commands for the axes servos, providing high performance with a significant reduction in hardware and a reduction in the computational burden placed on the data processor. The signal forms of the servos have a whole number square wave characteristic that is acceptable to the data processor in a non-adapted form to provide interactive communication between the data processor and the axes servos to provide adaptive control capability with this elemental extremity. The axes servos illustrate an extremity that can yield economy and versatility with a reduced burden on the data processor together with the additional capability of adaptive control.

This system comprises a numerical control machine, e.g. for three axis controlled machine, and closely integrates the operator and other input and output functions into the numerical control tasks. Minimal structure input-output extremities in this particular example comprise an elemental tape reader 216, operator control panel 214, servos 220-222 for independent tool axis control and a passive data display 218. The data processor 212 concurrently monitors these extremities, pre-processes data and generates extremity commands. The computer operates under program control to perform the other aspects of the task, including carrying out computations for tool path control, generating servo commands for each of the controlled axes, sequencing through the program, providing other machine controls and generating graphical and printed output data if needed.

Part program inputs are provided by a photo-electric punched tape reader 216 having Model No. RRS0304RA, manufactured by Remex Electronics.

Data and program storage is provided by a core memory 230 which may be a commercially available memory having Part no. 909838-A01, manufactured by Electronic Memories, Inc. This is a 8 bit 4096 word core memory which is primarily devoted to program storage. Remaining portions may be used for data storage if desired. In this application, the core memory 230 (CM) may be replaced by a read-only memory (ROM) or flip-flop memory.

Generally, the system operates by having the data processor sample the output of the tape reader 216 at a cyclic rate which is much faster than the operation of the tape reader 216. Formatting of tape is in accordance with EIA standards RS-274-B, INTERCHANGEABLE PERFORATED TAPE VARIABLE BLOCK FORMAT FOR CONTOURING AND CONTOURING/POSITIONING NUMERICALLY CONTROLLED MACHINES.

For the performance of many tasks, as in the numerical control field, systems in accordance with this invention can utilize a relatively small-scale computer without overloading. Concurrent performance of the subtasks does not in the usual instance result in excessive demands on the processor. To the contrary for numerical control systems, the general purpose computational capability of the system hereafter described can generally be utilized to perform many functions such as contouring functions.

The units 214, 216, 218, 220, 221, and 222 are extremities of the processor 212. These extremities, which may not be independent in terms of control, are largely directly coupled to the processor 212. Each extremity relies essentially upon the program capabilities of the processor 212. Each further effectively relies upon the processor 212 for pre-processing of the non-adapted signal forms for interpretation of signals and data transfer. In this respect, buffering, conversion, and signal conditioning functions ordinarily provided by interface circuits are also avoided. In a further respect, system extremities present data or output data in signal forms such that the processor itself can effect the significance of such terms.

This task-performing system may readily be modified, with a minimum of hardware changes to perform another task. Such change entails the essential modification of the system program, and also modification of the subtask programs and their relation to the task-pertinent program.

DATA PROCESSOR DESCRIPTION

A general purpose data processor is provided which is fully implementable with integrated circuits. Thus, an integrated circuit read-only memory (ROM) provides an example of a capability not found in present data processing systems. Other examples are a random access memory (RAM) and other types of flip-flop memories used alone or in combinations of integrated circuit memories for this data processing system.

The data processor 212 is shown by way of this example to be used in conjunction with a core memory 230. The basic architecture of this data processor will permit an integrated circuit memory, such as a read-only memory (ROM), or a random-access memory (RAM) or flip-flop type memory to be substituted for the core memory 230 to provide a completely integrated circuit computer which might be called a monolithic computer.

The data processor 212 is organized to operate in a manner somewhat similar to presently known stored program digital computers. The fundamental theory and technology of such presently known systems are described in Chapter 11 of *Digital Computer Design Fundamentals,* Yaohan Chu, McGraw-Hill Book Co., Inc. (New York, 1962).

A general purpose data processor in accordance with this invention may include multiple data and program registers, a random access memory and a scratch pad memory, and nonbuffered, directly coupled input-output lines connected to elemental input-output devices.

The data processor 212 is organized to process 8 bit words with most working and storage registers having a 16 bit capacity permitting the storage of two words. Serial transfer of data is used throughout the data processor 212 to minimize the control logic required.

The data processor 212 includes a 12 bit memory address register (M-Register) which defines a memory location being accessed in the core memory. A memory data register (D-Register) provides communication with the memory and an accumulator Register (A-Register) receives the results of numerical and logical operations and communicates with several Input/Output (I/O) channels. Thirty two Scratch Pad Memory (SPM) Registers provide convenient intermediate storage, independent of the main memory. A three bit counter divides the execution of program instructions into word times and a four bit counter subdivides the word times into bit times, the basic operating intervals.

The data processor operates by executing programmed instructions received from the core memory or other storage. When an instruction is executed, control logic causes the data processor to progress through a matrix of micro-operations, the exact path varying with the instruction being executed. Each micro-operation occurs during one of eight possible word times and performs a micro-operation portion of the instruction being executed. Upon completion of an FZ micro-operation, the data processor recycles through the matrix to begin execution of the next instruction.

The architecture of the data processor 212 lends itself to a fully integrated circuit computer mainframe where all of the logic is implemented with integrated circuits in a conventional manner and additionally includes an integrated circuit scratch pad memory (SPM). Further, this data processor 212 has the architecture to use an integrated circuit read-only memory (ROM) in place of or in addition to the core memory 230 providing a data processor that is constructed wholly of integrated circuit components.

Figure 4:
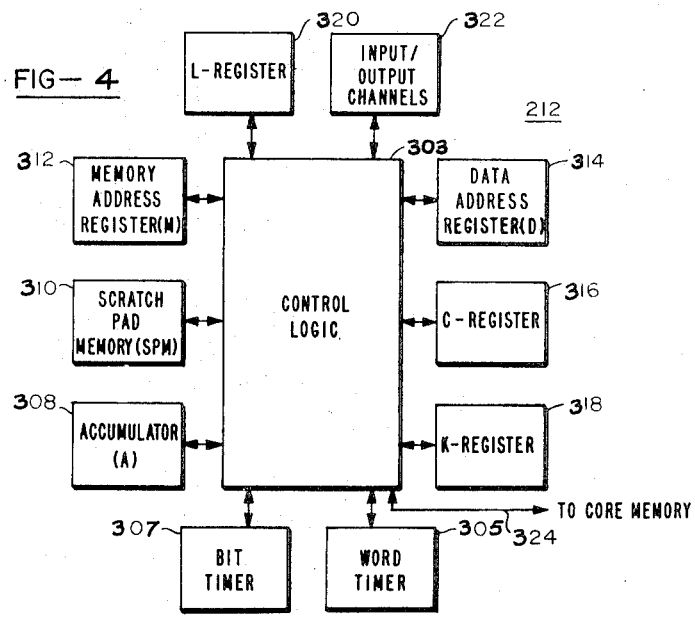
FIG. 4 is a block diagram representation of the data processor shown in FIG. 3.

In a simplified block diagram, the data processor 212 is shown in FIG. 4 as control logic 303 interconnecting registers, timers and communication channels.

The basic timing operations of the data processor 212 are performed by a word timer 305 and a bit timer 307. The synchronization of the data processor 212 is provided by an 8MHz clock signal which is included as part of the control logic 303. A synchronizing clock signal is an asymmetric square wave, the positive portion of which is designated $P_3$ and the negative portion of which is designated $\bar{P}_3$. An asymmetrical character of the clock signal permits a longer clock period without sacrifice of processing speed.

The word timer 305 is a three-bit counter with associated decode logic. It counts from 0 to 7 as the data processor cycles through the micro-operations during the performance of an instruction with each micro-operation being performed in a different word time. The associated decode logic provides eight output lines, each being true during one of the eight different counting states of the word timer 305. These output signals are used by the control logic 303 for sequencing the data processor through the micro-operations associated with an instruction. The bit timer is a four bit binary counter with associated decode logic. The bit timer 307 counts down from 15 through 0 and consequently the associated decode logic has 16 output lines, each going true during a different one of the 16 possible counts of the bit timer 307. The bit timer 307 provides sequencing and timing within a given micro operation or word time.

An accumulator (A-Register) 308 is the basic arithmetic register and is used as the repository of the results of arithmetic and logical operations. It is also the source and destination of the Input/Output (I/O) parameters. The A-Register is a 16 bit serial in, serial out shift register. Associated with the A-Register 308 is a serial full adder which is included within the control logic 303.

A scratch pad memory (SPM) 310 provides storage for intermediate computational results, return addresses, indexes and other pertinent information. The SPM 310 provides rapid internal storage without the need for transferring data to the main memory. It is a group of 32 16 bit serial in, serial out registers which are divided into two pages with 16 registers on each page. Paging is accomplished by toggling a flip-flop which automatically selects page 0 when the power is turned on.

A memory address register (M-Register) 312 holds the 12 bit address of an eight-bit byte to be accessed from the program memory. The M-Register 312 is a 12-bit shift register having the capacity to address up to 4,096 different memory locations. It has a serial input and both serial and parallel outputs. Associated with the M-Register 312 but represented as being within the control logic 303 is a serial full adder which increments the M-Register to access sequential instructions or, as applicable, the next two bytes of in-line instructions. The M-Register is incremented by two for a TX instruction when the condition for that transfer is not met, resulting in a skip of two bytes. The M-Register is incremented by three for a Skip-On-Discrete (SD) instruction. The M-Register is exchanged with the SPM$_2$ register for transfer type instructions and exchanged with a data address register (D-Register) 314 to access operands from the core memory. The M-Register is also exchanged with the SPM$_2$ register at the start of an ST instruction which causes the contents of the A-Register to be stored in core memory.

The data address register (D-Register) 314 is a 12 bit shift register that usually contains an operand address and is used to select: (a) SPM register, (b) I/O channel, and (c) number of shifts, depending upon the type of instruction being executed. The D-Register has a serial input and serial output, with the eight least significant bits ($D_0$-$D_7$) having parallel outputs in addition.

A C-Register 316 is composed of six flip-flops which store the six most significant bits of an eight-bit instruction byte obtained from program memory. The flip-flops $C_3$ through $K_{10}$ store the instruction bits designated $I_7$, $I_6$, $I_5$, $I_4$, $I_3$ and $I_2$, respectively as received from the core memory interface register (I). These instruction bits are held by the C-Register during the execution of an instruction to control the sequence of micro-operations executed during the performance of the instruction.

An element designated K-Register 318 is a group of miscellaneous flip-flops for various functions. The $K_0$, $K_1$, and $K_2$ flip-flops are used primarily to control sequencing through the micro-operations. A $K_1$ flip-flop is also used to store the sign of the operand in the A-Register and the sign of a decremented number during a TX instruction. A $K_2$ flip-flop is also used to extend the A-Register during a shift left operation where the $K_2$ Register acts as the $A_{-1}$ stage of the A-Register. $K_3$, $K_4$, and $K_5$ flips-flops may be grouped together and designated a KA-Register and may be used to store the address of the index. The KA-Register is also used as an extension of the A-Register during a shift left operation with $K_3$ as an $A_{-2}$ stage, $K_4$ as an $A_{-3}$ stage, and $K_5$ as an $A_{-4}$ stage of the A-Register. A $K_7$ flip-flop is used as a carry flip-flop in conjunction with the A-Register full adder. It is also used in a transfer of the D-Register contents to the M-Register as a shift left operation to multiply the D-Register word address to the level of the M-Register byte address. A $K_8$ flip-flop is used as a carry flip-flop in conjunction with the M-Register full adder. As previously described, the $K_{10}$ and $K_{11}$ flip-flops form the two least significant bits of the C-Register.

An element designated L-Register 320 is a group of miscellaneous flip-flops for performing control functions. The most significant is the $L_1$ flip-flop which controls turn-on and turn-off of the data processor.

Input/Output (I/O) channels 322 connect the A-Register with the various entities and extremities. The I/O channels are arranged in pairs so that as the output from the least significant bit ($A_0Q$) of the A-Register shifts information to an output channel a corresponding input channel may simultaneously shift information into the A-Register through the input to the most significant bit ($A_{15}D$).

A data path 324 provides two-way communication between the data processor and the core memory. This path carries the main core memory address stored in the M-Register and transfers operands to or from the main core memory data register (I).

Figure 5:
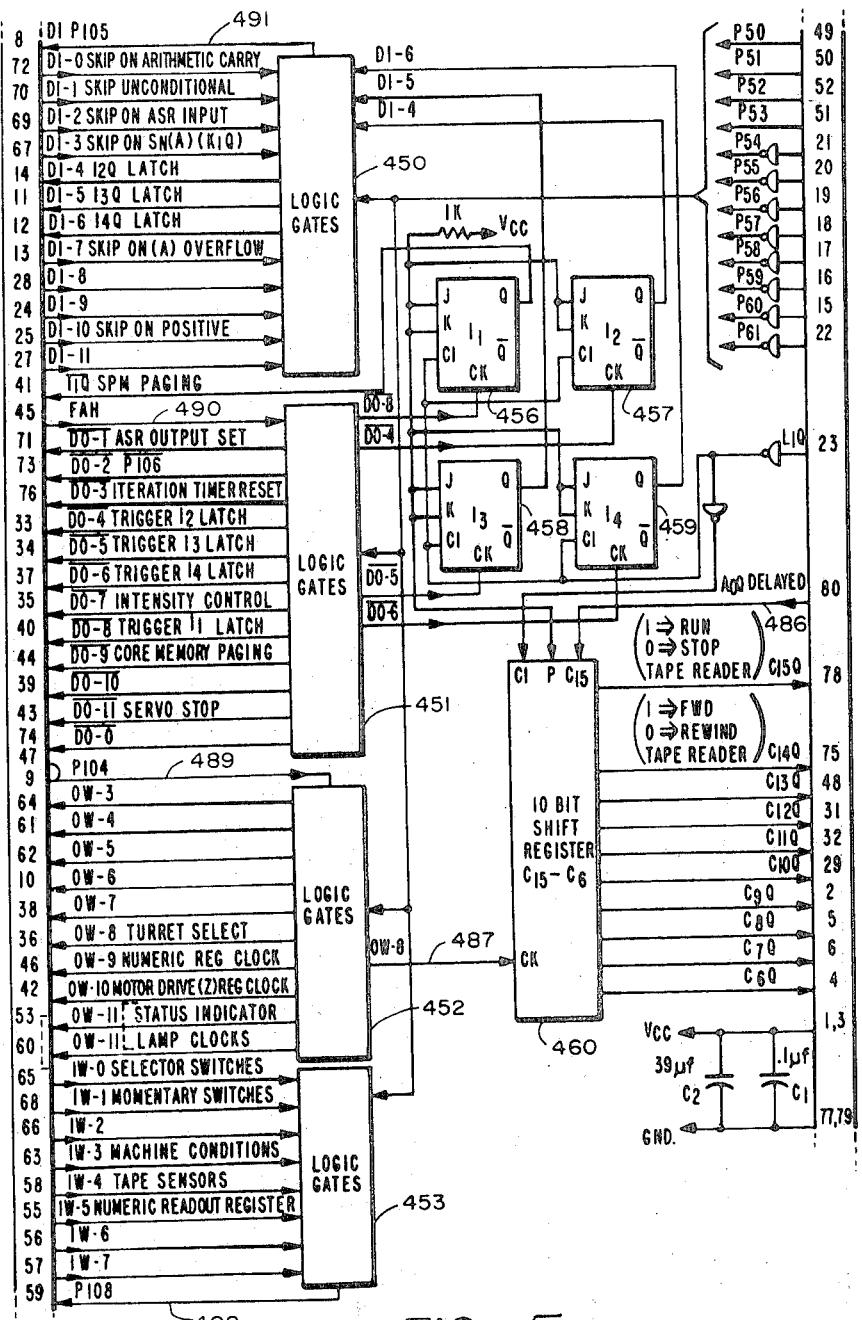
FIG. 5 is a schematic and block diagram representation of the IFA-board.

As shown in FIG. 5, the IFA-1 printed circuit board contains logic gates 450, 451, 452, and 453 providing input/output channels. The IFA-1 board accepts input and output type instruction micro-operation signals as well as address signals to encode or decode the various inputs and outputs. The input and output words are exchanged with the A-Register 308 in the data processor 212 (FIG. 4). The input words (IW) are multiplexed by logic gates 453 into signal P108 which is input to the A-Register. Information is output from the A-Register to the various entities by connecting the entities to $A_0Q$ and clocking a selected entity with a gated clock P104 as determined by logic gates 452. Discrete input (DI) signals are multiplexed into signal P105 by logic gates 450. Discrete output (DO) signals are decoded and gated by logic gates 451. Micro-operation FAH provides the gating signal. The discrete input signals are accessed with Skip-On-Discrete decision instructions. Each discrete output signal provides a short negative going pulse when selected with a Discrete Output instruction. The I-Register flip-flops $I_1$-$I_4$ perform the function of latches toggled or set with the discrete outputs. The $I_1$ flip-flop is used to directly provide a Scratch Pad Memory paging function. Outputs from the flip-flops $I_2$, $I_3$, and $I_4$ become discrete inputs. A C-Register 460 is loaded with output word 8 and used for general system operations. The signals P50-P61 are decoded operand addresses from the data processor.

The interface assembly (IFA-1) is not an interface in the conventional sense but constitutes a group of operations associated with the data processor. The interface assembly performs the function of signal distribution between the data processor and various system extremities.

INSTRUCTION REPERTOIRE

The program instructions for the numerical control system 210 are encoded as 8-bit bytes, each byte being stored in a different program memory location of the core memory 230. The instructions may have multiple bytes, but most have a length of only 1 byte. Each instruction contains an operation code in the most significant portion, and, when required, an operand address in the least significant portion.

The Input/Output (EX) instruction is a one-byte indexable instruction, wherein the four most significant bits identify the operation code and the four least significant bits identify an I/O channel address. The contents of the A-Register 308 are output to the addressed channel while the contents of the addressed channel are simultaneously loaded into the A-Register 308. A shift enable signal is output to gate 16 clock pulses to the selected channel. The FAB micro-operation occurs in word time 1 and has a duration of 16 bit times. The contents of the A-Register 308 are shifted to a selected output channel while the contents of a selected input channel are simultaneously shifted into the A-Register 308.

The data processor 212 can generate discrete outputs (DO) under program control. The DO assignments are:

DO-0    Spare.
DO-1    Provide clock pulses to ASR-33 (TELETYPEWRITER).
DO-2    Provides a clock to set the power turn-on interrupt, $L_1$. A DO-2 instruction (1100-0010) will be contained in program memory location $40_{16}$ to reset $L_1$ during power turn-on.
DO-3    Iteration timer reset.
DO-4    Trigger to $I_2$ latch, the discrete input-4(DI-4) input. The $I_2$ flip-flop is automatically zero set during the power on sequence.
DO-5    Trigger to $I_3$ latch, the discrete input-5(DI-5) input. The $I_3$ flip-flop is automatically zero set during the power turn-on sequence.
DO-6    Trigger to $I_4$ latch, the discrete input-6(DI-6) input. The $I_4$ flip-flop is automatically zero set during the power turn-on sequence.
DO-7    Intensity control.

DO-8 Toggles the $I_1$ flip-flop causing scratch pad memory paging.
DO-9 Main memory paging.
DO-10 Not implemented.
DO-11 Servo set.

The Discrete Output (DC) instruction is a one-byte indexably instruction, wherein the three most significant bits define the operation code and the five least significant bits define an output channel address. A discrete output signal, an inverted 3 microsecond pulse, is generated on the addressed output channel.

The data processor 212 can operate on a discrete input (DI) with a Skip-On-Discrete instruction under program control. The discrete inputs are various low frequency digital signals. The purpose of the discrete inputs is to define a status or condition. The DI assignments are:

DI-0 Not implemented.
DI-1 Skip unconditional.
DI-2 Skip on ASR-33 (TELETYPEWRITER).
DI-3 Skip on the sign of (A).
DI-4 Skip on $I_2Q$ latch (DO-4 trigger).
DI-5 Skip on $I_3Q$ latch (DO-5 trigger).
DI-6 Skip on $I_4Q$ latch (DO-6 trigger).
DI-7 Skip on logical overflow in A-Register
DI-8 Used for troubleshooting.
DI-9 Skip on arithmetic carry from A-Register.
DI-10 Skip on positive.

The Skip-On-Discrete (SK) instruction is a one-byte indexable instruction, wherein the three most significant bits identify the operation code and the five least significant bits identify a discrete input channel address. If a discrete exists on the addressed channel, three bytes (usually a transfer instruction) are skipped and the next instruction is obtained from the fourth byte following the Skip-On-Discrete instruction. If a discrete does not exist on the addressed channel, the next instruction (usually a three-byte transfer instruction) is obtained from the three bytes immediately following the Skip-On-Discrete instruction. The FAG micro-operation occurs in word time 1 for the Skip-On-Discrete instruction and has a duration of 12 bit times. If the selected discrete is true, the M-Register 412 is clocked and incremented by three. If the selected discrete is false, the M-Register 312 is not clocked and is therefore not incremented.

COMMAND STRUCTURE DESCRIPTION

Figure 6:
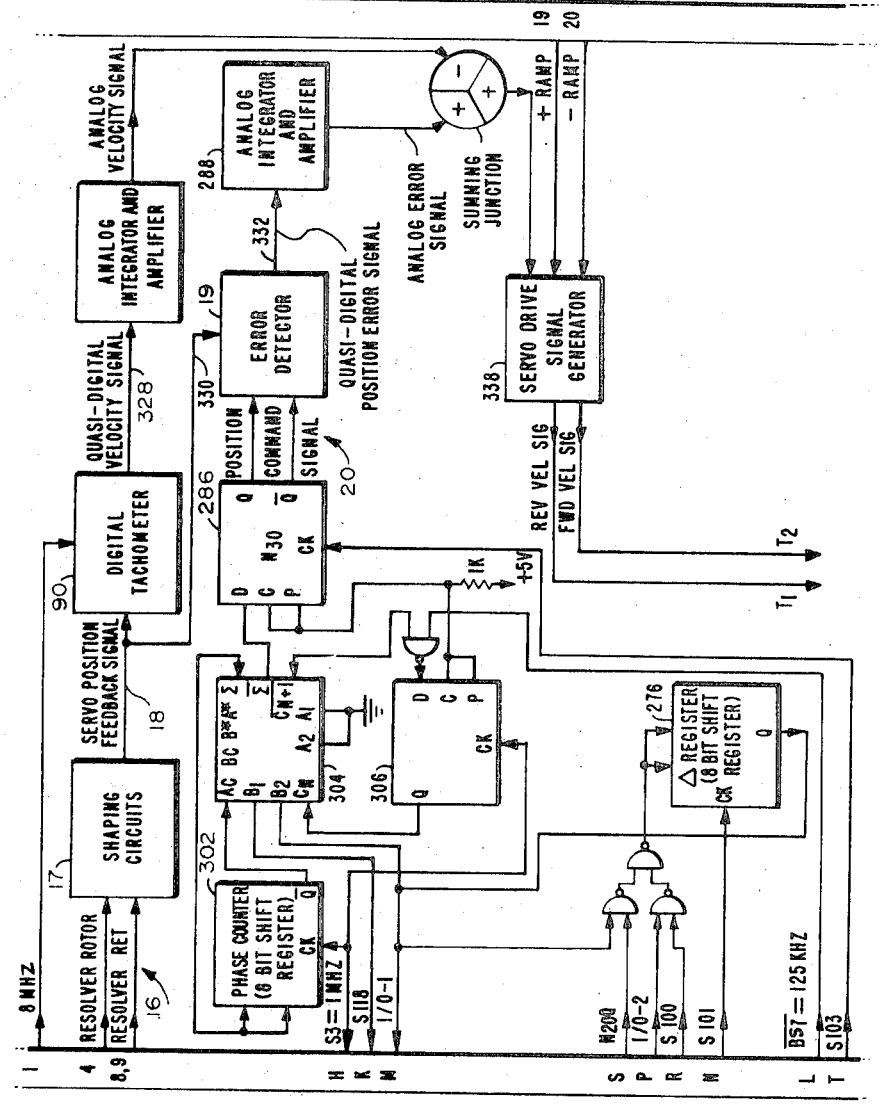
FIG. 6 is a schematic and block diagram representation of the servo channel circuit board.

The three servos 220, 221, and 222 (FIG. 3) are identical in one embodiment of the invention and are exemplified by the X-axis servo 220 as shown in FIG. 6. The three servos, a common board and the A-Register are serially connected in a loop. Data passes from the A-Register and is input to a Δ-Register 276 (FIG. 6) on the X-axis servo board via I/O channel-2. Data then passes from the X-axis channel board via I/O channel-1 to the I/O channel-2 of a Y-axis servo board (not shown). Similarly, data passes out of a Y-axis servo board into a Z-axis servo board (not shown) and out of a Z-axis servo board to a common board (not shown) and back to the A-Register. Thus, communication is provided between the data processor, three servo boards and a common board.

The servo drives generate control signals to position the servo motors in response to these commands transferred from the data processor. A resolver is used to provide a closed servo feedback loop. The resolver output signal is a square wave that is processed on the servo board with shaping circuits 17 and applied to an error detector 19 which also receives command signals from a flip-flop $N_{30}$ 286. An error signal from the error detector 19 is converted to an analog error signal by an analog integrator and amplifier 288. The command signal 20, which is a square wave, is generated by the phase counter 302, which is continually incremented to form a square wave, where the phase of that square wave is changed by a number in the Δ-Register 276 with a full adder 304 and carry flip-flop 306. The command signal 20 is a square wave with a phase that is advanced or retarded with a positive or negative command number. The phase counter sign bit $N_{30}$ 286 provides a command square wave which is compared with the resolver feedback square wave 18 in the error detector 19 to generate an error signal. This error signal has a polarity defined by flip-flop which defines whether the feedback signal leads or lags the command signal. NAND gates provide an exclusive-OR function defining the out-of-phase condition of the feedback and command square waves with an output pulse 332 having a width that is proportional to the magnitude of the error. The error signal is actually a two wire ternary signal, wherein the line that contains the pulse defines the polarity and the width of the pulse defines the magnitude.

The calculations for the commands which are loaded into the Δ register 276 (FIG. 6) are performed in the data processor 212 under program control. This capability eliminates the need for the digital differential analyzer computational elements typically used for contouring. The relative magnitudes of the Δ parameters loaded into the plurality of channel card Δ registers define the relative position commands or, as a function of time, the relative velocity commands of the plurality of servo channels. As these commands are executed, the three servo axes are driven relative to each other to provide fully synchronized operation controlled through the computations in the data processor.

An alternate technique would replace the $N_{30}$ flip-flop 286 (FIG. 6) with a toggle flip-flop which would be clocked by a data processor discrete output (DO) command at appropriate times, thereby generating an output square wave with the timing of that discrete output command controlling the phase and thereby defining the whole number position command. This controlled square wave is an intrinsic signal form which is used directly by the servos in the error detector 19 (FIG. 6) as the command input. It is generated directly by the data processor 212 with a precisely timed discrete output under program control as defined by the contouring computations.

The data processor 212 can operate interactively in conjunction with the servo intrinsic signal forms where the square wave servo has parameters such as velocity 328, position 18, and position error 20 available in square wave form. The data processor can interrogate these square wave signals as discrete inputs with the Skip-On-Discrete instructions and derive the parameter from the pulse width or phase of the square waves.

It is thus clearly seen that the present invention provides a novel means and method of providing a contact printing system for generating high registration masks.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. A system for generating good registration exposures, said system comprising:
   control means for providing control signals;
   a machine for providing a plurality of contact exposures of a master image means on an illumination sensitive medium in response to the control signals;

master image means for selectively exposing the illumination sensitive medium, said master image means including a plurality of spaced apart master images for exposing a plurality of arrays of image exposures having good registration between the plurality of arrays wherein each array of image exposures corresponds to a spaced apart master image; and
   illumination sensitive medium operationally connected for receiving the selective exposures and for providing a plurality of exposure arrays each having a plurality of exposures of a corresponding spaced apart master image and each having good registration therebetween.

2. The system as set forth in claim 1 above, further comprising contact exposure means for providing the plurality of contact exposures wherein each of the plurality of contact exposures generates a corresponding image in each of the plurality of exposure arrays.

3. The system as set forth in claim 1 above, further comprising translation means for providing positional translation between the illumination sensitive medium and the master image means wherein the registration precision between the plurality of arrays is substantially better than the positional accuracy between the exposed images in each of said arrays.

4. The system as set forth in claim 1 above, wherein the plurality of master images are spaced apart from each other on said master image means by distances related to the desired spacing between said plurality of arrays.

5. The system as set forth in claim 1 above, wherein each of the arrays of exposed images is related to a corresponding one of the master images and wherein each of the arrays has good registration in relation to each of the other arrays.

6. The system as set forth in claim 1 above, wherein said system is a photographic mask making system for making a plurality of integrated circuit masks having good registration, said system further comprising:
   translation means for providing translation between said master means and said illumination sensitive medium for controlling position therebetween; and
   contact exposure means for exposing the illumination sensitive medium with the master image means at a plurality of different positions for generating an array of exposures including a plurality of exposed images related to a corresponding master image, wherein each of the plurality of master images generates a corresponding array and wherein each image in one of the arrays is related to each corresponding image in each of the other arrays.

7. The machine as set forth in claim 1 above, further comprising:
   a plurality of containing means including master containing means for containing the master image means and medium containing means for containing the illumination sensitive medium; and
   contact means for providing translation between said master containing means and said medium containing means in a first direction to bring said master containing means and said medium containing means into contact for providing an exposure and in a second direction to bring said master containing means and said medium containing means apart for providing clearance therebetween.

8. The machine as set forth in claim 7 above, further comprising positioning means for providing positioning translation between said master containing means and said medium containing means in a direction substantially perpendicular to the translation direction of said contact means, said positioning translation providing for changing the relative position of said master containing means and said medium containing means therebetween.

9. An illumination exposure system comprising:
   means for generating control signals;
   means for containing a plurality of illumination devices, said illumination devices including an exposure responsive medium and a master image;
   means for exposing said exposure responsive medium with said master image;
   positioning means for providing positioning translation between said illumination devices; and
   means for providing a plurality of clearance positions between said exposure responsive medium and said master image, wherein the clearance positions include a first clearance position for providing positioning translation of the positioning means and a second clearance position for removal and replacement of at least one of the illumination devices.

10. A contact exposure system comprising:
    means for generating control signals;
    a machine for providing contact exposures in response to the control signals;
    means for generating a contact signal in response to a contact condition; and
    contact control means for controlling a contact condition in response to the contact signal.

11. A contact exposure system comprising:
    means for generating control signals;
    a machine for providing contact exposures in response to the control signals;

a proximity sensor for generating a proximity signal in response to a contact proximity condition and proximity control means for controlling said machine in response to the proximity signal.

12. The contact exposure system as set forth in claim 11 above, wherein said proximity control means provides for control of translation velocity, said proximity control means providing a first velocity in response to a first state of the proximity signal and providing a second velocity in response to a second state of the proximity signal.

13. A contact exposure system comprising:
control means for generating control signals;
contact means for providing contact exposures in response to the control signals;
positioning means for providing translation between a plurality of exposure positions; wherein at least one of said control signals is a contact control signal, wherein said control means generates the contact control signal at a time when said positioning means is providing positioning translation to a next exposure position, and wherein said contact means initiates contact translation in response to the contact control signal at a time when said positioning means is providing the positioning translation.

14. A contact exposure system comprising:
control means for generating control signals;
contact means for providing contact exposures in response to the control signals;
positioning means for providing positioning translation between a plurality of exposure positions; wherein at least one of said control signals is a positioning control signal, wherein said control means generates the positioning control signal at a time when said contact means is providing retract translation to a retract position, and wherein said positioning means initiates positioning translation in response to the positioning control signal at a time when said contact means is providing the retract translation.

15. An illumination exposure system comprising:
control means for generating control signals;
containing means for containing a plurality of illumination devices, said illumination devices including an exposure responsive medium and a master image;
exposure means for exposing said exposure responsive medium with said master image; and
removeable means included in said containing means for providing access to at least one of said illumination devices.

16. An illumination exposure system comprising:
control means for generating control signals;
containing means for containing a plurality of illumination devices, said illumination devices including an exposure responsive medium and a master image;
exposure means for exposing said exposure responsive medium with said master image; and
for providing a clearance position with a small distance between said exposure responsive medium and said master image for rapidly translating therebetween.

17. A contact exposure system comprising:
control means for providing control signals; and
a machine for providing contact exposures of master image means on an illumination sensitive medium in response to the control signals, said machine including orientation means for providing repeatable angular orientation between said illumination sensitive medium and said master image means.

18. The orientation means as set forth in claim 17 above, comprising first surface means having an angular orientation related to the angular orientation of the illumination sensitive medium and second surface means having an angular orientation related to the orientation of the master image means for providing the repeatable angular orientation therebetween.

19. The orientation means as set forth in claim 17 above, comprising first taper means operationally connected to the illumination sensitive medium and second taper means operationally connected to the master image means for providing the repeatable angular orientation therebetween.

20. The machine as set forth in claim 17 above, wherein said orientation means is operationally connected between said master image means and said illumination sensitive medium for providing an angular orientation repeatability therebetween substantially better than an angular orientation accuracy therebetween.

21. A system for making contact exposures, said system comprising:
control means for providing control signals;
a machine for providing contact exposures of a master image on an illumination sensitive medium in response to the control signals;
positioning means for providing translation between said illumination sensitive medium and said master image, said positioning means having a first position precision characteristic; and
orientation means for providing repeatable angular orientation between said illumination sensitive medium and said master image, said orientation means having a second position precision characteristic related to an angular nonrepeatability related tangential translation, said orientation means providing the second position precision characteristic with substantially greater precision than the first position precision characteristic.

22. A contact exposure system comprising:
control means for providing control signals; and
a machine for providing contact exposures of master image means on an illumination sensitive medium in response to the control signals, said machine including contact pressure means for controlling contact pressure between said illumination sensitive medium and said master image means.

23. The machine as set forth in claim 22 above, wherein said contact pressure means includes compliance means for controlling the contact pressure with a compliance characteristic of said compliance means.

24. A contact exposure system comprising:
control means for providing control signals;
a plurality of illumination devices including a master image and an illumination sensitive medium;
a machine for providing contact exposures of said master image on said illumination sensitive medium in response to the control signals; said machine including means for adjusting to a thickness characteristic of at least one of said illumination devices.

25. A contact exposure system comprising:
control means for providing control signals; and
a machine for providing contact exposures of master image means on an illumination sensitive medium in response to the control signals, said machine including means for providing translation between said master image means and said illumination sensitive medium, said translation providing means having a positional accuracy characteristic substantially less precise than a desired registration precision, said machine providing the desired registration precision in response to the control signals.

26. The contact exposure system as set forth in claim 25 above, wherein said master image means includes a plurality of spaced apart images, wherein each of said spaced apart images is related to a desired cluster of images, wherein said machine provides a plurality of the contact exposures for exposing a plurality of clusters, wherein each cluster includes a plurality of exposures of a particular spaced apart image, and wherein each of said clusters provides good registration with each other of said clusters.

27. The contact exposure system as set forth in claim 25 above, wherein said machine further includes orientation means for providing repeatable angular orientation between said illumination sensitive medium and said master image means.

28. The contact exposure system as set forth in claim 25 above, wherein said master image means includes a plurality of spaced apart images, said translation being less than the distance between two of the spaced apart images.

29. The contact exposure system as set forth in claim 25 above, wherein at least one exposure of said master image means on said illumination sensitive medium overlaps a plurality of other exposures of said master image means on said illumination sensitive medium.

30. A contact exposure system comprising:
control means for providing control signals;
a plurality of illumination devices including a master image and an illumination sensitive medium;
a machine for providing contact exposures of said master image on said illumination sensitive medium in response to the control signals; said machine including translation means for providing positioning translation between said illumination devices, detector means for generating a contact signal in response to a contact condition, and interlock means for disabling the positioning translation in response to the contact signal.

31. A system for generating a plurality of exposures having good registration therebetween, said system comprising:
control means for providing a control signal;
a machine for providing contact exposures of a master image means on an illumination sensitive medium in response to the control signals; said machine including positioning means for providing translation between said master image means and said illumination sensitive medium, said positioning means having a translation distance substantially smaller than the size of said master image means.

32. A machine system comprising:
control means for providing control signals;
exposure means for providing exposures of a master image means on an illumination sensitive medium in response to the control signals;
master containing means for containing the master image means;
means containing means for containing the illumination sensitive medium; and
positioning means for providing translation between said master containing means and said medium containing means, said positioning means having a maximum translation distance smaller than the size of the master containing means.

33. A system for generating good registration exposures, said system comprising:
control means for providing control signals;
a machine for providing a plurality of contact exposures of a master image on an illumination sensitive medium in response to the control signals, said machine including illumination means for providing illumination, said master image means being responsive to the illumination for exposing said illumination sensitive medium to generate the contact exposures.

34. The machine as set forth in claim 33 above, further comprising positioning means for providing translation between the master image means and the illumination sensitive medium and having translation distances substantially less than the effective exposure area.

35. The machine as set forth in claim 33 above, further comprising:
means for providing translation between the master image means and the illumination sensitive medium; and
containing means for containing the master image means having a size greater than the maximum distance of translation.

36. The machine as set forth in claim 33 above, further comprising:
means for providing translation between said master image means and said illumination sensitive medium to a plurality of different exposure positions spaced apart by distances less than the distances between a plurality of master images;
means for providing a contact exposure of said master image means on said illumination sensitive medium at each of the exposure positions; and
a plurality of master images included on said master image means for providing a corresponding plurality of exposure images on said illumination medium for each of the contact exposures.

37. The illumination means set forth in claim 33 above, further comprising a plurality of spaced apart means for illuminating each of a corresponding plurality of master images included on said master image means.

38. The illumination means set forth in claim 37 above, further comprising positioning means for positioning each of the spaced apart illuminating means for illuminating a corresponding master image.

39. The system as set forth in claim 33 above, further comprising a stored program data processor means for processing digital information in response to a stored program and for generating at least one of the control signals under program control.

40. A contact exposure system comprising:
a machine for providing contact exposures of a master image on an illumination sensitive medium in response to control signals;

control means for providing the control signals, said control means including a stored program data processor operable under control of a stored program to generate the control signals, said data processor including a read only memory for storing the stored program.

41. The control means as set forth in claim 33 above, further comprising digital means for generating at least one of the control signals.

42. The system as set forth in claim 33 above, wherein the control signals include at least one translation signal for controlling said machine means to translate between exposure positions.

43. The system as set forth in claim 33 above, wherein the control signals include at least one exposure control signal for controlling the exposure of the illumination sensitive medium.

44. The system as set forth in claim 33 above, further comprising:

feedback means included in said machine means for generating a feedback signal in response to a machine condition; and feedback processing means included in said control means and operationally connected to said feedback means for generating at least one of the control signals in response to the feedback signal.

45. The control means as set forth in claim 33 above further comprising input means for providing input signals, said control means generating at least one of the control signals in response to the input signals.

* * * * *